(12) United States Patent
Pasternak (10) Patent No.: US 10,906,443 B2
(45) Date of Patent: Feb. 2, 2021

(54) ACTUATION DEVICE FOR UNLOCKING A BACKREST, COMPRISING TWO ACTUATION ELEMENTS AND AN INDICATOR FOR DISPLAYING THE BACKREST LOCK

(71) Applicant: VOLKSWAGEN AKTIENGESELLSCHAFT, Wolfsburg (DE)

(72) Inventor: Lukasz Pasternak, Meine (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 79 days.

(21) Appl. No.: 16/151,937

(22) Filed: Oct. 4, 2018

(65) Prior Publication Data

US 2019/0031068 A1    Jan. 31, 2019

Related U.S. Application Data

(63) Continuation of application No. PCT/EP2017/057910, filed on Apr. 4, 2017.

(30) Foreign Application Priority Data

Apr. 4, 2016    (DE) .................. 10 2016 205 485

(51) Int. Cl.
*B60N 2/90*    (2018.01)
*B60N 2/36*    (2006.01)
*B60N 2/20*    (2006.01)

(52) U.S. Cl.
CPC .............. *B60N 2/919* (2018.02); *B60N 2/20* (2013.01); *B60N 2/206* (2013.01); *B60N 2/366* (2013.01);

(Continued)

(58) Field of Classification Search
None
See application file for complete search history.

(56) References Cited

U.S. PATENT DOCUMENTS 5,419,616 A    5/1995 Paetzold
6,170,913 B1 *    1/2001 Seibold .................. B60N 2/305
297/316

(Continued)

FOREIGN PATENT DOCUMENTS

CN    102686446 A    9/2012
CN    103459197 A    12/2013

(Continued)

OTHER PUBLICATIONS

International Search Report dated Jul. 10, 2017 in corresponding application PCT/EP2017/057910.

(Continued)

*Primary Examiner* — David E Allred
(74) *Attorney, Agent, or Firm* — Muncy, Geissler, Olds & Lowe, P.C.

(57) ABSTRACT

An actuating device for releasing a locked release and/or adjustment mechanism of a vehicle seat having a first and a second actuating element. Provision is made that the first and second actuating elements and an indicator element are arranged together in a housing of the actuating device. The actuating elements are connected to at least one actuating mechanism that provides for a release of the locked release and/or adjustment mechanism upon actuation of one of the actuating elements. The actuation of one of the actuating elements substantially simultaneously results in an actuation and indication of the indicator element concerning the released or locked state of the release and/or adjustment mechanism.

17 Claims, 10 Drawing Sheets

(52) U.S. Cl.
CPC .... *B60N 2002/971* (2018.02); *B60N 2205/40* (2013.01)

(56) References Cited

U.S. PATENT DOCUMENTS

| | | | | |
|---|---|---|---|---|
| 6,648,393 | B1* | 11/2003 | Milnar | B60N 2/01583 296/65.11 |
| 9,216,672 | B2 | 12/2015 | Windecker et al. | |
| 9,248,760 | B2 | 2/2016 | Boy et al. | |
| 9,290,116 | B2 | 3/2016 | Teufel et al. | |
| 2003/0047977 | A1* | 3/2003 | Lejeune | B60N 2/01541 297/344.1 |
| 2005/0264043 | A1* | 12/2005 | Brandes | B60N 2/366 297/85 C |
| 2006/0061184 | A1 | 3/2006 | Jennings | |
| 2009/0250986 | A1* | 10/2009 | Maier | B60N 2/062 297/257 |
| 2012/0175927 | A1 | 7/2012 | Parker et al. | |
| 2013/0161993 | A1* | 6/2013 | Otsuka | B60N 2/22 297/354.12 |
| 2013/0200678 | A1* | 8/2013 | Hirokawa | B60N 2/366 297/378.13 |
| 2013/0312466 | A1* | 11/2013 | Teufel | B60N 2/366 70/237 |
| 2013/0320736 | A1* | 12/2013 | Teufel | B60N 2/366 297/383 |
| 2014/0070589 | A1* | 3/2014 | Teufel | B60N 2/206 297/378.13 |
| 2016/0016493 | A1* | 1/2016 | Deppe | B60N 2/0232 297/378.12 |
| 2016/0137105 | A1* | 5/2016 | Akutsu | B60N 2/3047 297/341 |

FOREIGN PATENT DOCUMENTS

| | | | | |
|---|---|---|---|---|
| DE | 4314443 | C1 | 6/1994 | |
| DE | 19653216 | A1 * | 6/1997 | ............ B60N 2/366 |
| DE | 1014286 | A1 | 3/2003 | |
| DE | 10342724 | A1 * | 4/2005 | ........... B60N 2/0881 |
| DE | 102005019764 | A1 * | 11/2006 | ........... B60N 2/0875 |
| DE | 102007058332 | A1 | 6/2009 | |
| DE | 102011018330 | A1 | 10/2012 | |
| DE | 102011116709 | A1 | 4/2013 | |
| DE | 102012012657 | A1 | 12/2013 | |
| DE | 102013202010 | A1 * | 8/2014 | ............ B60N 2/366 |
| DE | 102013221540 | A1 | 4/2015 | |
| DE | 102015200495 | A1 * | 7/2016 | ............ B60N 2/366 |
| FR | 2879529 | A1 * | 6/2006 | ........... B60N 2/0881 |
| FR | 2961136 | A1 * | 12/2011 | ............ B60N 2/366 |
| JP | H08119010 | A | 5/1996 | |
| JP | 2011-143843 | A | 7/2011 | |
| JP | 2013506597 | A | 2/2013 | |
| KR | 20130118983 | A | 10/2013 | |
| WO | WO2012104093 | A1 | 8/2012 | |

OTHER PUBLICATIONS

Korean Office Action dated Oct. 30, 2019 in corresponding application 10-2018-7022912.

Chinese Office Action for Chinese Application No. 20170021424.8 dated May 27, 2020 with English translation.

* cited by examiner

ACTUATION DEVICE FOR UNLOCKING A BACKREST, COMPRISING TWO ACTUATION ELEMENTS AND AN INDICATOR FOR DISPLAYING THE BACKREST LOCK

This nonprovisional application is a continuation of International Application No. PCT/EP2017/057910, which was filed on Apr. 4, 2017, and which claims priority to German Patent Application No 10 2016 205 485.6, which was filed in Germany on Apr. 4, 2016, and which are both herein incorporated by reference.

BACKGROUND OF THE INVENTION

Field of the Invention

The invention relates to an actuating device for releasing a locked release and/or adjustment mechanism of a vehicle seat having a first and a second actuating element.

Description of the Background Art

Actuating devices for releasing a locked release and/or adjustment mechanism of a vehicle seat having at least one actuating element are known from the documents DE 10 2012 012 657 A1, DE 10 2011 116 709 A1 (which corresponds to U.S. Pat. No. 9,248,760 and is incorporated herein by reference), and DE 10 2007 058 332 A1.

The conventional actuating devices, however, do not include an indicator for indicating an actuation state of the actuating device, with the result that there can be no indication for the user of the locking state of the locked release and/or adjustment mechanism of the vehicle seat.

Solutions regarding indication of the locking state of the backrest portion of the vehicle seat with respect to the seat portion of the vehicle seat can be found in the prior art.

From the document DE 10 2011 018 330 A1 is known an actuating unit for a vehicle seat having a handle for jointly actuating two locks, a power transmission unit between the handle and each lock, a first indicator that is associated with the first power transmission unit, and a second indicator that is associated with the second power transmission unit, wherein the two indicators each indicate the locking state of the associated lock, and the two indicators drive an overall indicator with a logical OR function to visibly indicate the released state.

Furthermore, the document DE 10 2013 221 540 A1 discloses a locking indicator for a vehicle seat with multiple locking elements, having an indicator opening with a status indicator visible therein. Provision is made that for each locking element, a respective status indicator with an indicator part for the unlocked state of the locking element is provided, and that at least a portion of the indicator part is visibly arranged in the area of the indicator opening when the locking element is not locked, wherein the display parts for locking elements that are not locked at least partially cover one another.

SUMMARY OF THE INVENTION

It is therefore an object of the present invention to provide a solution for an actuating device for releasing a locked release and/or adjustment mechanism of a vehicle seat and of a rear seat system, in particular of a seat back release, that permits release of the backrest portion with respect to a seat portion in a substantially vertical initial position of the backrest portion and in a substantially horizontal folded position (cargo position) of the backrest portion folded onto the seat portion, wherein a new, convenient, in particular user-friendly, and safe actuating concept is sought that fits into the body in a backrest in an elegantly proportioned manner. With regard to safety, the actuating device to be created should be capable of detecting and signaling a locked state of the backrest portion relative to the seat portion or a released state of the backrest portion relative to the seat portion. This object arises, for example, from the circumstance that prior art vehicle seats are designed such that the backrest portion can be brought into positions in which the backrest portion is not locked relative to the seat portion. According to the object of the invention, these positions should be signaled to the user so that the user feels called upon to lock the backrest portion relative to the seat portion when the backrest portion is in an unlocked state relative to the seat portion.

The starting point of the invention is an actuating device for releasing a locked release and/or adjustment mechanism of a vehicle seat having a first and a second actuating element.

Provision is made according to an exemplary embodiment of the invention that the first and second actuating elements and an indicator element are arranged together in a housing of the actuating device, wherein the actuating elements are connected to at least one actuating mechanism that always provides for a release of the locked release and/or adjustment mechanism upon actuation of one of the actuating elements, wherein the actuation of one of the actuating elements simultaneously results in an actuation and indication of the indicator element concerning the released or locked state of the release and/or adjustment mechanism.

The actuating device has the advantage, as compared to the document DE 10 2011 018 330 A1, that just one indicator element suffices to indicate the released or locked state of the release and/or adjustment mechanism, wherein the indication takes place regardless of whether the first or second actuating element has been actuated.

The actuating device has the advantage, as compared to the document DE 10 2013 221 540 A1, that a respective status indicator is not implemented for each locking element of a released or locked release and/or adjustment mechanism. Namely, the indicator element senses, in advantageous manner, all locking elements of the release and/or adjustment mechanism that can be brought from the locked state to the released state by actuation via the first or second actuating element, as is described in greater detail in the description.

In an embodiment of the invention, provision is made that an actuation of the first actuating element or an actuation of the second actuating element via the at least one actuating mechanism causes, independently of one another, the release of the locked release and/or adjustment mechanism. In other words, the actuating device permits an actuation—that is independent of the actuation of the first or second actuating element—of one and the same actuating mechanism through which a release of the release and/or adjustment mechanism is possible. In this design, the indicator element is advantageously integrated into the actuating device and is connected to the actuating mechanism in such a way that the indicator element always permits an indication concerning the released or locked state of the release and/or adjustment mechanism, likewise independently of the actuation of the first or second actuating element.

In an embodiment of the invention, provision is made that the first actuating element, together with a lever that is in operative connection therewith, is rotatably supported on an axle, and the first actuating element can be pivoted on a pivot axis formed by the axle from an initial position to a final actuation position, as a result of which, upon actuation of the first actuating element from an unactuated initial position to a final actuation position, the at least one actuating mechanism provides for the release of the locked release and/or adjustment mechanism of a vehicle seat and at the same time transfers the indicator element from its unactuated position to its actuated position.

The first actuating element can be in operative connection with a lever constituting a central element. The first actuating element and lever are rotatably supported together on an axle. This arrangement is compact and simple to implement, wherein the second actuating element advantageously is also brought into operative connection with the lever. Because the first actuating element and the second actuating element are both in operative connection with the lever, it is possible to couple the desired functions for actuating the actuating mechanism and for actuating the indicator element to the motion, in particular to the pivoting motion of the lever about the pivot axis.

Provision is thus made, in a manner analogous to the first actuating element, that the second actuating element is also in operative connection with the lever, which is rotatably supported on the axle, wherein the second actuating element can also be moved from an initial position to a final actuation position, as a result of which, upon actuation of the second actuating element from an unactuated initial position to a final actuation position, the at least one actuating mechanism provides for the release of the locked release and/or adjustment mechanism of a vehicle seat and at the same time transfers the indicator element from its unactuated position to its actuated position.

Provision is made according to the invention that the lever in operative connection with the first and second actuating elements has at least one Bowden cable carrier, wherein upon actuation of one of the actuating elements from the initial position to the final actuation position, the lever displaces the Bowden cable carrier, which is connected at one end to the at least one Bowden cable and is connected at its other end to the release and/or adjustment mechanism of a vehicle seat. In advantageous fashion, the at least one Bowden cable carrier is integrated into the lever itself. Prior solutions disclose separate Bowden cable carriers that are carried along by the lever during a motion of the lever. In this regard, this solution represents a compact and more simple solution.

The indicator element here can be in operative connection with an indicator element lever. The indicator element lever is arranged to be rotatable on the axle and is connected in a rotationally fixed manner to the lever, which is rotatable on the axle about the first pivot axis. Here too, it becomes evident that the inventor has recognized in advantageous manner that an attachment of the indicator element lever to the lever having the Bowden cable carrier is advantageous in order to transmit the pivoting motion of the lever to the indicator element lever one-to-one.

The indicator element lever can have a lever arm disc that forms a bearing element that includes a first bearing part and a second bearing part, wherein the first bearing part is supported in a rotationally fixed manner on the lever and the second bearing part is rotatably supported in the housing of the actuating device in relevant bearings provided therefor. By means of this design, the indicator element lever is prepared in a simple manner to be able to carry a spring element, and at the same time can easily be supported in the housing of the actuating device.

Namely, the lever arm disk can carry an indicator element spring element, which has a first end and a second end, wherein the first end is supported in the indicator element and the second end is supported on the housing of the actuating device. The arrangement of a spring element to establish a connection between the indicator element and the indicator element lever through the lever arm disc represents a simple solution, since the ends of the indicator spring element can be supported in positions suitable for this purpose, one on the indicator element and another on the housing of the actuating device.

The lever arm of the indicator element lever on the lever arm disc can have an open end that rests against a contour of the indicator element, wherein the contour is implemented as a ridge that forms a contoured contact surface on which the open end of the lever arm rests, wherein the contact surface forms a first contour region and a second contour region. By means of this solution, the indicator element lever achieves guidance of the indicator element during the translational motion of the indicator element inside the housing from the unactuated position of the indicator element to the actuated position of the indicator element and vice versa, as is described in detail in the description.

The lever arm of the indicator element lever can pivot upon actuation of one of the actuating elements from the initial position to the final actuation position and an accompanying actuation of the lever, as a result of which the first end of the preloaded spring element exerts a force on the indicator element, by which means a vertical translational motion of the indicator element within the pocket is effected, by which means the indicator element moves from its unactuated, retracted position into the actuated, extended position.

The indicator element can have an indicator element upper part and an indicator element lower part, wherein the indicator element upper part and the indicator element lower part are located below a top of the housing of the actuating device in the unactuated, retracted position, and the indicator element upper part stands up in an opening of the housing so as to be visible from outside, wherein, in the actuated, extended position, the indicator element upper part extends completely through the opening and the indicator element lower part extends at least partially through the opening, so that the indicator element upper part and the indicator element lower part project out of the housing and are visible from outside. By means of the design and arrangement of the contour regions formed by the ridge and by the contact surfaces of the contour regions, it is possible in advantageous manner to determine how far the indicator element upper part and the indicator element lower part extend past the top of the housing when the indicator element is in the actuated, extended position. Analogously, it is possible to determine how far the indicator element upper part and the indicator element lower part retract into the opening of the housing when the indicator element is in the unactuated, retracted position.

For the purposes of the present description, the customary direction of travel of a vehicle is labeled "+x" ("plus x"), the direction opposite its customary direction of travel is labeled "−x" ("minus x"), the direction in the horizontal plane perpendicular to the x-direction is labeled "y", and the direction in the vertical plane perpendicular to the x-direction is labeled "z". This system of notation for the spatial directions in Cartesian coordinates corresponds to the coordinate system generally used in the automotive industry.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
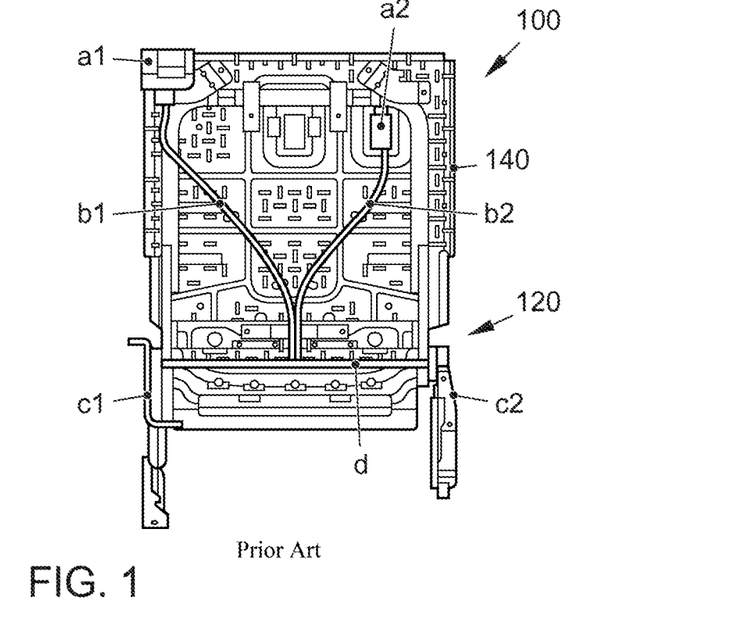
FIG. 1 is a rear view of a vehicle seat with a backrest portion with two separately located actuating elements for releasing fittings between the backrest portion and seat portion according to the prior art.
Figure 2:
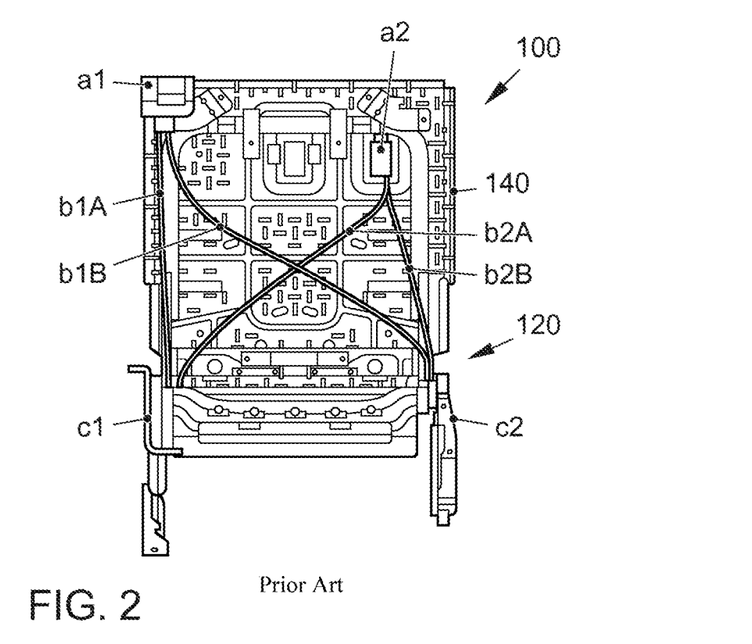
FIG. 2 is a rear view of a vehicle seat with a backrest portion with two separately located actuating elements for releasing fittings between the backrest portion and seat portion according to the prior art.

First, two known actuation concepts for releasing a backrest portion 140 relative to a seat portion 120 of a vehicle seat 100 are explained using FIGS. 1 and 2.

FIGS. 1 and 2 each show a view from the rear of the vehicle seat 100. Two actuating elements, which are labeled a1 and a2, are arranged on the backrest portion 140 of the vehicle seat 100 in each case.

An actuating mechanism composed of Bowden cables, which are labeled b1, b2 in FIG. 1 and b1A, b1B, b2A, b2B in FIG. 2, transmits an actuating motion of separately arranged actuating elements a1 and a2 to the fittings c1, c2 located on both sides between the seat portion and backrest as an adjustment mechanism.

The actuation of the actuating elements a1, a2 results in the release of the fittings c1, c2. In FIG. 1, only two Bowden cables b1, b2 are arranged, since a transmission element d that is part of the actuating mechanism, in particular a transfer rod, transmits the motion of the actuating elements a1 and a2 to the fittings c1, c2 located on both sides.

In FIG. 2, no such transmission element d is arranged, so as many as four Bowden cables b1A, b1B, b2A, b2B are necessary to communicate the motion of the actuating elements a1 and a2 to the fittings c1, c2 located on both sides.

Figure 3:
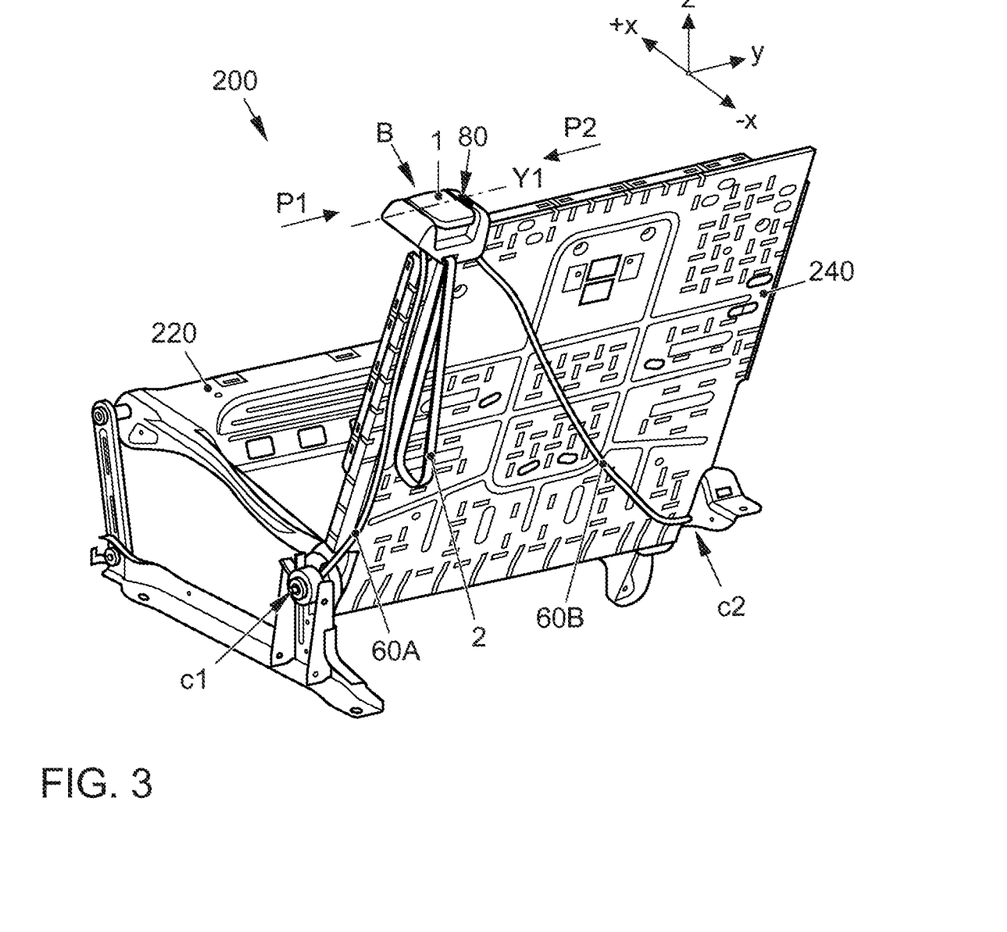
FIG. 3 is a perspective view of a vehicle seat with an actuating device according to the invention with two actuating elements combined in the actuating device, likewise in the example of releasing fittings between the backrest portion and seat portion.

FIG. 3 shows a perspective view of a vehicle seat 200 according to the invention, in particular in an embodiment as a rear seat system with an actuating device B with two actuating elements 1, 2 combined in a single actuating device B, using the example of releasing fittings c1 and c2 between a backrest portion 240 and a seat portion 220 of the rear seat system.

In FIG. 3, the actuating device B is shown in the installed state on a backrest portion 240 of a vehicle seat 200. When the vehicle seat 200 is in the normal position in a vehicle, a pivot axis Y1 of the actuating device B is transverse to the direction of travel +/−x of the vehicle.

Release between the backrest portion 240 and the seat portion 220, and the tilt adjustment thereof, with subsequent locking is accomplished, for example, by means of a combined release and adjustment mechanism, in particular through the fittings c1 and c2, which are components of the combined release and adjustment mechanism.

Explicit reference is made to the fact that the actuating device B can also be used for releasing a locking mechanism of the vehicle seat 200 as a whole (for example for removing the seat) or for releasing an adjustment mechanism for seat rail release (for longitudinal adjustment of the seat).

Depending on the relevant application, the Bowden cables 60A, 60B shown in FIG. 3 can be routed to release elements of the locking mechanism between the vehicle seat 200 and the attachment of the vehicle seat 200 on the vehicle side (releasable seat base) or to the adjustment mechanism between the vehicle seat 200 and the seat rails on the body side (releasable seat rail locking).

One of the above-described solutions is explained below, in which the Bowden cables 60A, 60B are routed to release elements of the adjustment mechanism implemented as fittings c1, c2 between the backrest portion 240 and seat portion 220 of the vehicle seat 200, or have a releasing action on the fittings c1, c2.

FIG. 3 defines the view of an observer—from the rear—of the vehicle seat 200 for arrow P1 as from the "left" and for arrow P2 as from the "right" of the actuating device B, for the following description. According to the invention, the actuating device B includes an indicator element 80. In the exemplary embodiment shown, the indicator element 80 is located on the right side of the actuating device B. It is a matter of course that it is generally also possible for the indicator element 80 to be located on the left side of the actuating device B with adaptation of the construction of the actuating device B.

FIG. 3 shows, by way of example, a ⅓ part of a rear seat bench. It is a matter of course that a ⅔ part of a rear seat bench can also be equipped with the actuating device B.

Figure 4A:
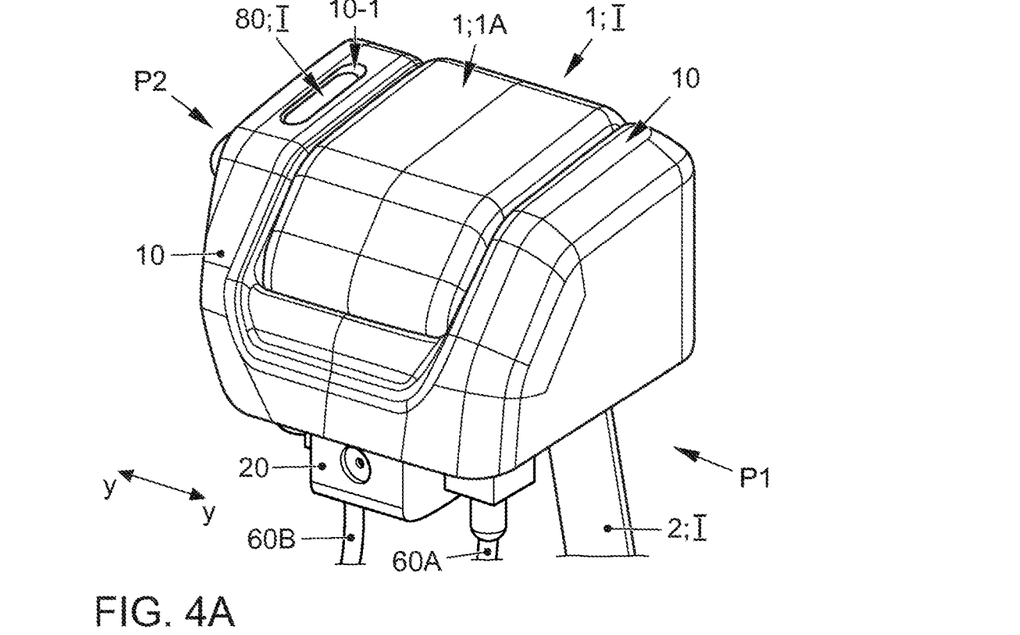
FIG. 4A is a perspective outside view, obliquely from above, of the actuating device in the initial position in the assembled state.
Figure 4B:
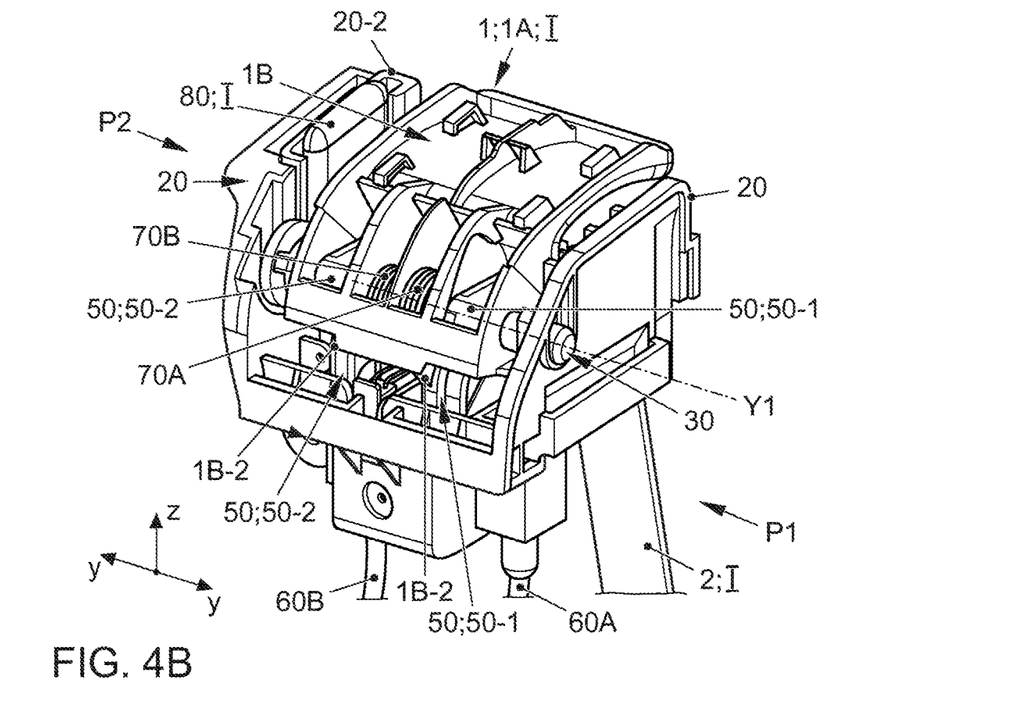
FIG. 4B is a perspective inside view, obliquely from above, in the actuating device in the initial position in the assembled state.
Figure 4C:
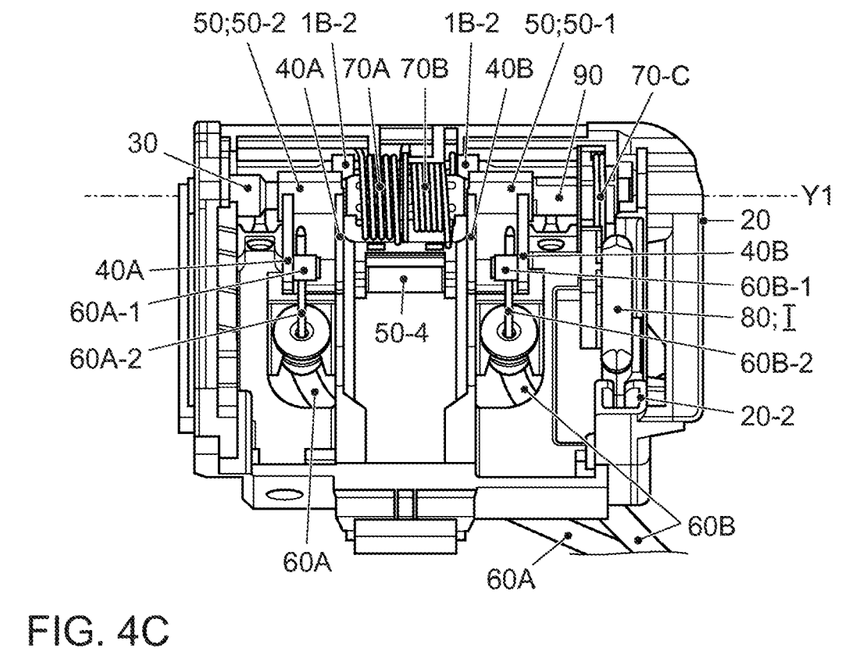
FIG. 4C is an inside view from above of the actuating device, omitting an upper handle part and a lower handle part, in the initial position in the assembled state.

FIG. 4A shows a perspective outside view of the actuating device B in the assembled state. FIG. 4B shows a perspective inside view of the actuating device B, likewise in the assembled state. FIG. 4C shows an inside view from above in the actuating device B (omitting an upper handle part 1A and a lower handle part 1B of a handle 1) in the initial position in the assembled state.

FIGS. 4A, 4B, and 4C, taken together as a whole, are explained below.

The actuating device B includes a cover 10 and a first actuating element 1 that is implemented as a handle 1. The cover 10 is also referred to as a cap. In the installed state of the actuating device B, the cover 10 encloses a stationary housing 20 that is located inside the cover 10. In the exemplary embodiment, the cover 10 has an opening 10-1 on its top, in which the indicator element 80 or an upper region of the indicator element 80 is located in the assembled state of the actuating device B. The construction, arrangement, and function of the indicator element 80 are discussed in greater detail below.

It can already be seen in FIGS. 4A to 4C that the indicator element 80 is arranged in a pocket 20-2 on the housing side so as to be movable vertically in the z direction. The indicator element 80 in each case is located in an unactuated, retracted position 80; I.

The handle 1 is likewise in an unactuated initial position 1, I in FIGS. 4A and 4B. In this initial position 1; I of the handle 1, the indicator element 80 sits in the cover 10, which is to say in an unactuated, retracted position 80; I. The unactuated, retracted position 80; I of the indicator element 80 is considered to be a position in which the top of the indicator element 80 does not project above the top of the cover 10.

As a result, only the top of the indicator element 80 is visible; this is not provided with a safety color because the fittings c1, c2 are securely locked in the retracted position 80, I of the indicator element 80, so that no warning indication for the user about an unlocked state is necessary.

The handle 1 has an upper handle part 1A (FIG. 4A) and a lower handle part 1B (FIG. 4B), which are rigidly joined together, preferably snapped together, in the assembled state. The lower handle part 1B is supported on a rotationally fixed axle 30 by means of a base part 1B-1 so as to be pivotable about the pivot axis Y1. The base part 1B-1 has an opening through which the base part 1B-1 is pushed onto the rotationally fixed axle 30.

The lower handle part 1B is connected to a first end 70A-1 (FIG. 9B) of a first spring element 70A, whose second end 70A-2 (FIG. 9B) is supported on the stationary housing 20.

This spring element 70A is also referred to as the handle spring element. The first handle spring element 70A is placed with its windings around the rotationally fixed axle 30 in the manner of a bearing, but is not rigidly attached to the axle 30. During an actuation, and thus a pivoting motion, of the handle 1 about the pivot axis Y1 from the initial position 1; I to a final actuation position 1; II, the first handle spring element 70A is tensioned.

The initial position 1; I of the handle 1 is additionally shown in cross section in the subsequent FIG. 5A (view P1 from the left).

Figure 7A:
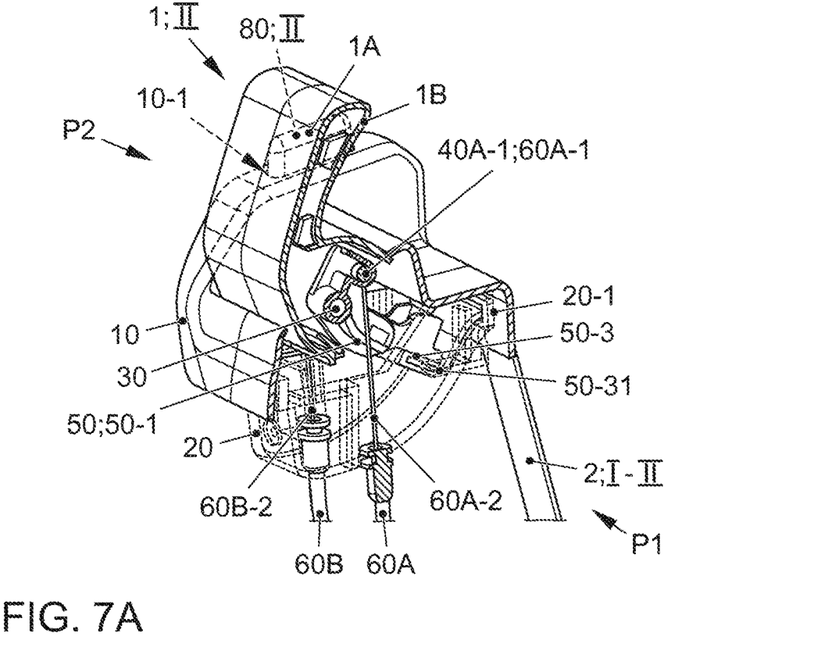
FIG. 7A illustrates the cross-section as in FIG. 5B.
Figure 7B:
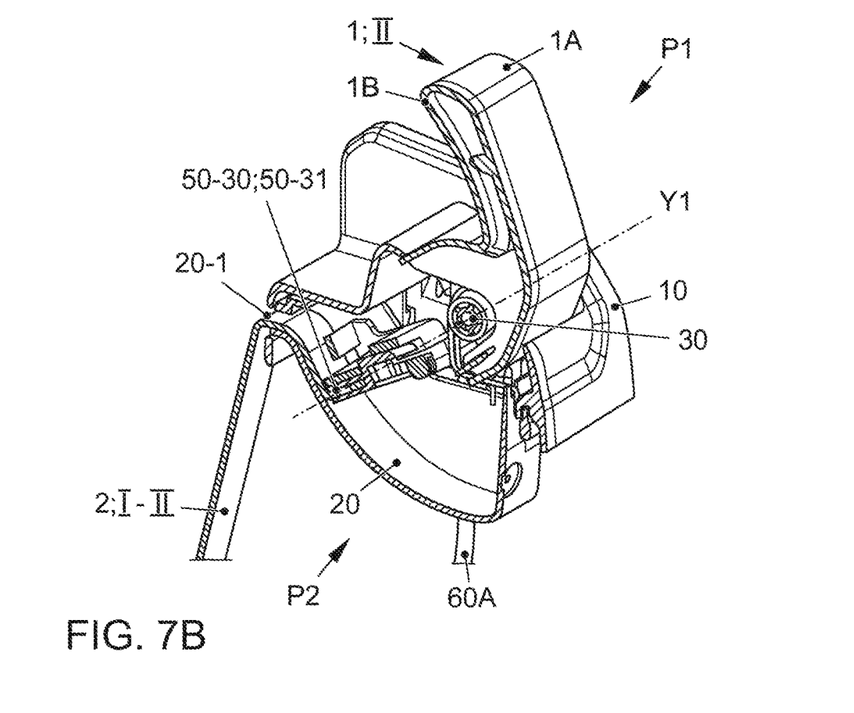
FIG. 7B illustrates a cross-section in the x-z plane through the actuating device in the final actuation position of the first actuating element (view from the right)

In the other figures, the initial position 1; I of the handle 1 is also labeled with the reference symbol 1; I. The final actuation position 1; II of the handle 1 that is completed after a first actuation operation is shown in FIGS. 5B, 7A, and 7B and is labeled with the reference symbol 1; II.

As a result of the tensioning of the first handle spring element 70A, a spring force is produced during the first actuation operation that forces an opposite pivoting motion of the handle 1 as soon as the handle 1 is released, which is to say when it is no longer actuated. The handle 1 thus automatically returns from the final actuation position 1; II to its initial position 1; I due to spring force support.

In addition, a lever 50 is located in a supported manner on the rotationally fixed axle 30 that likewise is not rigidly connected to the axle 30, but instead is likewise capable of pivoting about the pivot axis Y1 relative to the axle 30.

In the exemplary embodiment, the lever 50 from FIGS. 4A and 4B is designed such that a first lever region 50-1 (shown on the left) and a second lever region 50-2 (shown on the right) are formed, between which are located the first handle spring element 70A and a second spring element 70B, which is referred to as a lever spring element. The second spring element 70B will be discussed later.

The lever regions 50-1, 50-2 each have an opening, wherein, in the assembled state, the lever 50 is pushed into the base part 1B-1 by way of the lever regions, after which the lever 50 is secured in the base part 1B-1 by means of the rotationally fixed axle 30 that engages the openings in the lever regions 50-1, 50-2 of the lever 50 through the opposing openings of the base part 1B-1.

FIG. 4C, in particular, additionally shows that the lever regions 50-1, 50-2 include a first Bowden cable carrier 40A and a second Bowden cable carrier 40B. With respect to the pivot axis Y1 extending in the y-direction (double headed arrow y), the Bowden cable carriers 40A, 40B are arranged one behind the other on an axis parallel to the pivot axis Y1.

Bowden cable attachments 40A-1, 40B-1 for the two Bowden cables 60A, 60B are provided in the Bowden cable carriers 40A, 40B. The first Bowden cable attachment 40A-1 is shown in FIGS. 5A to 5C and FIG. 10B, while the second Bowden cable attachment, which is of analogous design, is not visible in the figures.

In the assembled state, end pieces 60A-1, 60B-1 of cores 60A-2, 60B-2 of the first Bowden cable 60A and of the second Bowden cable 60B that run in Bowden cable jackets are mounted in the Bowden cable attachments 40A-1, 40B-1. The assembled state is shown best in FIG. 4C.

In the exemplary embodiment, the lever 50, which is shown only in a top view in FIGS. 4A to 4C, has a strap mounting 50-3, visible in the subsequent figures, in which a second actuating element 2 is mounted. It is a matter of course that the connection does not necessarily have to be accomplished through a strap mounting 50-3. Other connection concepts are possible. The strap mounting 50-31 in the exemplary embodiment is implemented in a receiving element 50-3 that is connected to a center piece 50-4 of the lever 50.

The second actuating element 2 is implemented as a pull strap, by which means the pull strap 2 is easily reachable for actuating the actuating device B from a trunk of the vehicle due to its customizable strap length, which is individually adaptable from vehicle to vehicle. The desired release of the actuating device B is accomplished within a second actuation operation by pulling on the pull strap 2.

The pull strap 2 is in an unactuated initial position 2; I in FIGS. 4A, 4B, and 4C.

The lever 50 in the exemplary embodiment is laterally connected to a first end 70B-1 (FIG. 9B) of a second spring element 70B whose second end 70B-2 (FIG. 9B) is supported on the stationary housing 20. The second spring element is also referred to as a lever spring element. The second spring element 70B is placed with its windings around the rotationally fixed axle 30 in the manner of a bearing in a manner analogous to the first spring element 70A, but is not rigidly attached to the axle 30.

The lever 50 in the exemplary embodiment is laterally connected to a first end 70B-1 (FIG. 4B) of a second spring element 70B whose second end 70B-2 (FIGS. 4B and 10A) is supported on the stationary housing 20. The second spring element 70B is placed with its windings around the axle 30 in the manner of a bearing, but is not rigidly attached to the rotationally fixed axle 30.

During an actuation, and thus a motion of the pull strap 2 from the initial position 2; I to the final actuation position II with simultaneous carrying along and pivoting of the lever 50 about the pivot axis Y1, the second spring element 70B is tensioned. The tensioning of the second spring element 70B creates a spring force that forces an opposite pivoting motion of the lever 50 about the pivot axis Y1 and thus the pull strap 2 as soon as the pull strap 2 is released, which is to say when it is no longer actuated.

The pull strap 2 thus automatically returns from the final actuation position 2; II or a possible intermediate position 2; I-II to its initial position 2; I due to spring force support. The intermediate position 2; I-II will be discussed later.

Figure 5A:
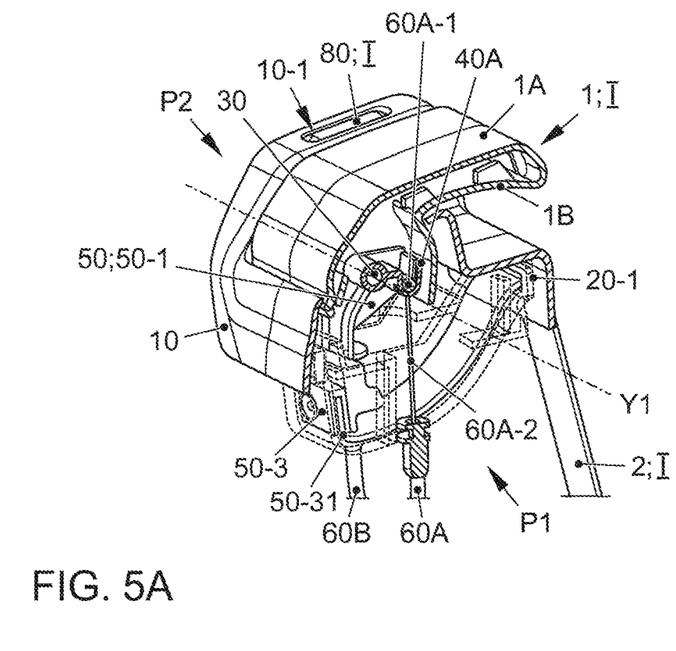
FIG. 5A illustrates a cross-section in an x-z plane through the actuating device in the initial position (view from the left)
Figure 5B:
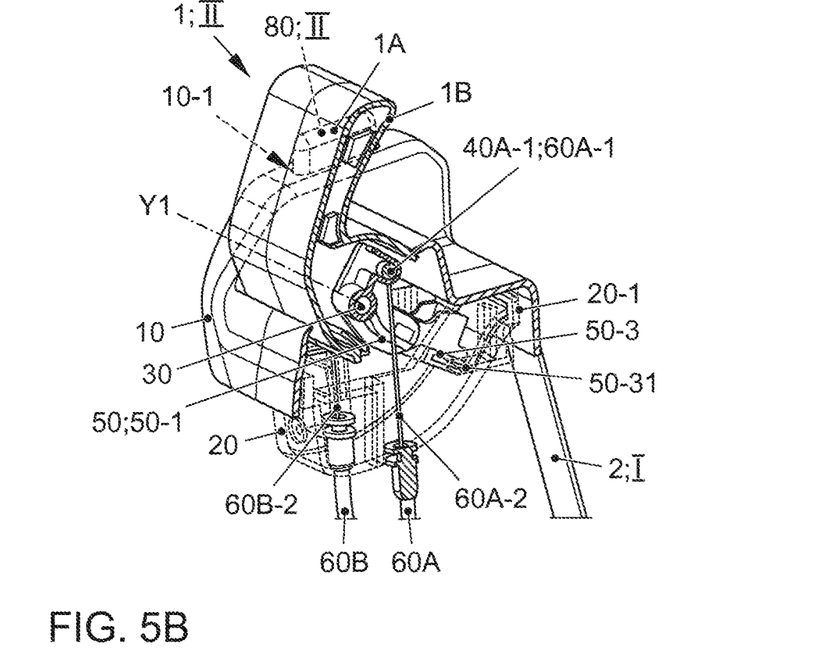
FIG. 5B illustrates a cross-section in the x-z plane through the actuating device in the final actuation position of the first actuating element (view from the left)

FIG. 5A shows a cross-section in an x-z plane (view P1 from the left) through the actuating device B, wherein the handle 1 and the pull strap 2 are each in the initial position I. It is once again evident in this first cross section that the handle 1 (first actuating element) and the pull strap 2 (second actuating element) are arranged such that they are both integrated in a single actuating device B.

The handle 1 and the pull strap 2 are not directly connected, as the description of FIGS. 4A and 4B has already made clear. FIG. 5B shows another cross section in the x-z plane (view P1 from the left) through the actuating device B in the final actuation position 1; II of the handle 1. For purposes of illustration, both Bowden cables 60A, 60B are shown, wherein in FIG. 5B only the first Bowden cable attachment 40A-1 and the first end piece 60A-1 of the first core 60A-1 of the first Bowden cable 60B is visible.

First Actuation Operation—Actuation of the Handle 1:

The handle 1 is pivoted by pivoting it counterclockwise (in the +x direction) about the pivot axis Y1 in FIG. 5B. When this takes place, the indicator element 80 moves from its unactuated, retracted position 80; I into an actuated, extended position 80; II.

In this process, the handle 1 carries the lever 50, and thus the Bowden cable attachments 40A-1, 40B-1 of the two Bowden cable carriers 40A, 40B (see also FIGS. 9A, 9B) that are integrated into the lever 50, with it in the direction of pivoting, counterclockwise as shown in FIG. 5B, as is explained in detail in the subsequent figures.

Figure 9A:
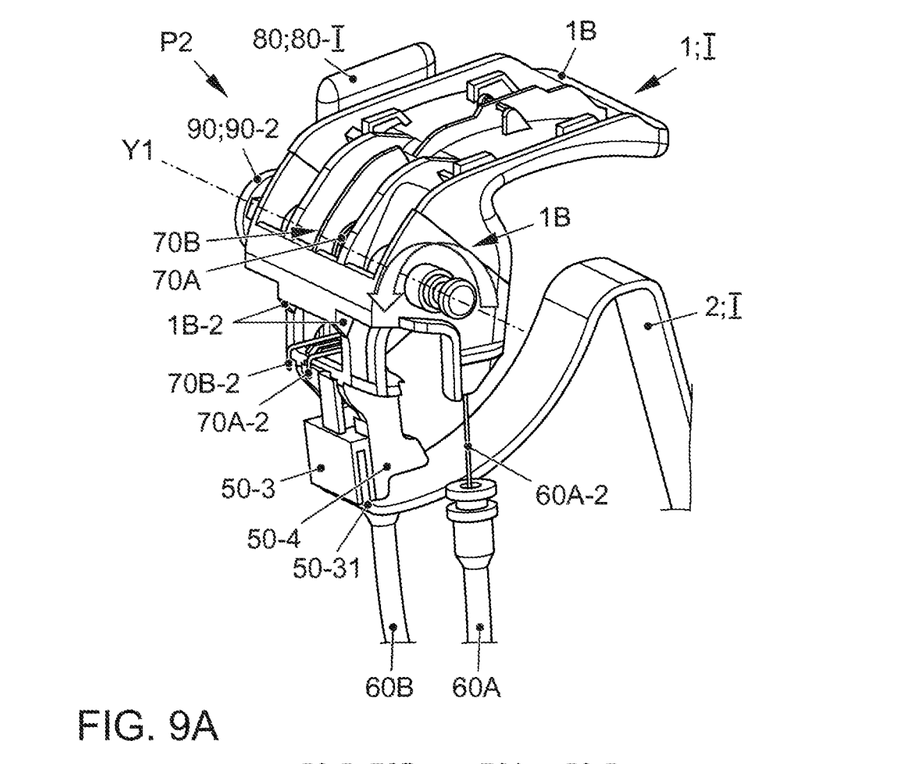
FIG. 9A is an enlarged perspective representation of the actuating elements of the actuating device in the initial position (view from the left)
Figure 9B:
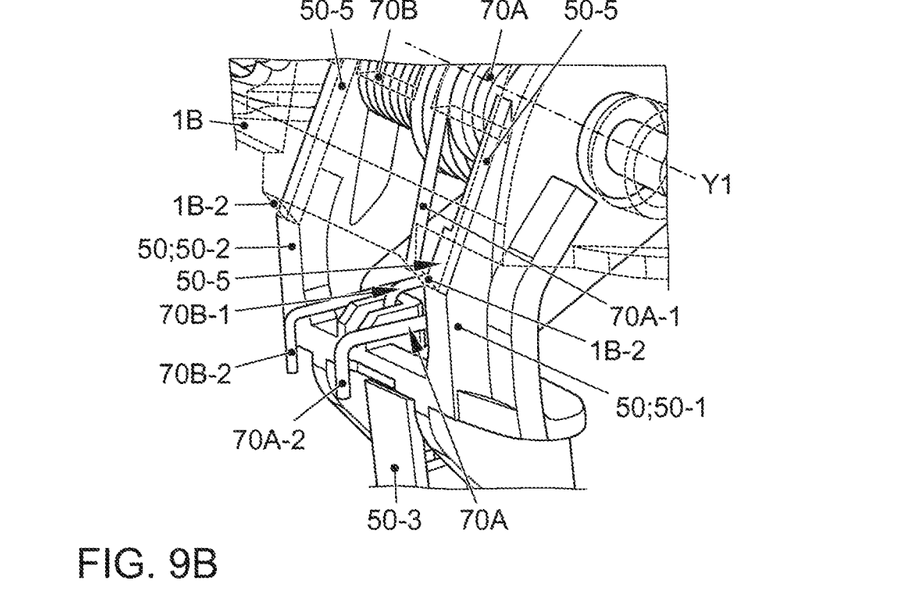
FIG. 9B is a more enlarged perspective representation of a lever to illustrate a first actuation operation during the actuation of the first actuating element, which is represented as transparent (view from the left)

Shown in FIGS. 4B, 9A, and 9B are carrier extensions 1B-2 that are located on the inside of the base part 1B-1 of the handle 1. In the initial position I of the handle 1; I, these carrier extensions 1A rest against contact surfaces 50-5 (refer, in particular, to FIG. 9B) of the lever 50.

By pivoting of the handle 1 about the pivot axis Y1 counterclockwise as shown in FIG. 5B, the lever 50 is likewise pivoted clockwise, as a result of which the end pieces 60A-1, 60B-1 mounted in the Bowden cable attachments 40A-1, 40B-1, and thus the cores 60A-2, 60B-2 of the Bowden cables 60A, 60B that are connected to the end pieces 60A-1, 60B-1, are pulled.

In this first actuation operation, the Bowden cable carriers 40A, 40B are carried along by the base part 1B-1 of the lower handle part 1B (see FIGS. 9A, 9B).

At the same time, the handle spring element 70 is tensioned.

During the pivoting motion of the handle 1 about the pivot axis Y1, the carrier extensions 1B-2 come into contact with the contact surfaces 50-5 of the lever 50, as a result of which the lever 50 is carried along counterclockwise as explained with FIG. 5B, so that as a result the pull strap 2, which is connected through the strap mounting 50-31 to the lever 50, is moved with it to the right, into the intermediate position 2; I-II. The point in time when the lever 50 is carried along is structurally determined by the design and/or arrangement of the carrier extensions on the lower handle part 1B or the design and/or arrangement of the lever 50 in the region of the contact surfaces 50-5, or can be varied accordingly.

Figure 5C:
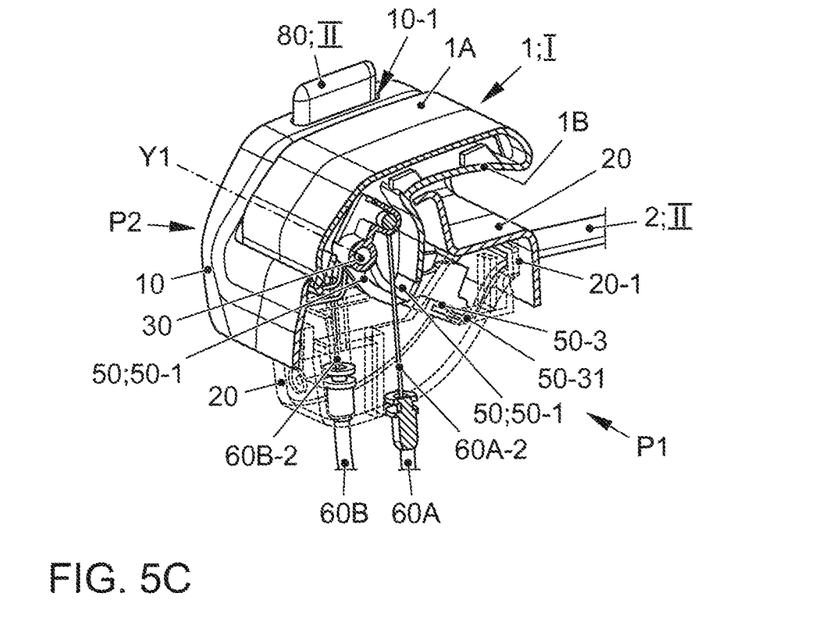
FIG. 5C illustrates a cross-section in the x-z plane through the actuating device in the final actuation position of the second actuating element (view from the left)

Second Actuation Operation—Actuation of the Pull Strap 2:

FIG. 5C shows another cross section in the x-z plane (view P1 from the left) through the actuating device B with the final actuation position 2; II of the pull strap 2. In this process, the indicator element 80 comes from its unactuated, retracted position 80; I to an actuated, extended position 80; II.

In the course of the actuation, which is to say the pulling on the pull strap 2, the pull strap 2 is steadily moved from the initial position 2; I to the final actuation position 2; II, wherein the pull strap 2 is passed out through a housing opening 20-1 of the housing and is moved out of the housing opening 20-1 during the actuation.

The pull strap 2 is pulled, as a result of which the lever 50 connected to the pull strap 2 through the strap mounting 50-31 is pivoted counterclockwise therewith (in the +x direction) about the pivot axis Y1 as shown in FIG. 5C (analogous to the first actuation operation). The end pieces 60A-1, 60B-1 mounted in the lever-integrated Bowden cable attachments 40A-1, 40B-1, and thus the cores 60A-2, 60B-2 of the Bowden cables 60A, 60B connected to the end pieces 60A-1, 60B-1, are pulled in a manner analogous to the first actuation operation. The lever 50, starting from its position in FIG. 5A, thus pivots counterclockwise into the final actuation position 2; II of the pull strap 2 due to the actuation of the pull strap 2 into the position shown in FIGS. 8A and 8B.

To summarize briefly, in both actuation operations, handle actuation and pull strap actuation, the Bowden cables 60A, 60B are pulled simultaneously by the pivoting of a single lever 50.

In the case of the second actuation operation, the handle 1 is not carried along by the lever 50 in the course of the pivoting motion of the lever 50 about the pivot axis Y1 during actuation of the pull strap 2 from the initial position 2; I to the final actuation position 2; II.

In advantageous manner, the handle 1 and pull strap 2 are completely decoupled in the second actuation operation, with the result that when the pull strap 2 is actuated from the initial position 2; I to the final actuation position 2; II there is no danger that a person will be pinched in any way by the handle 1 being carried along and pivoting out from the housing 20. The handle 1, which is completely decoupled from the pull strap 2 during actuation of the pull strap 2, remains in its initial position 1; I.

The intermediate position 2; I-II of the pull strap 2 is reached by carrying the lever 50 along during the full actuation of the handle 1 (handle actuation of the first actuation operation) from the initial position 1; I to the final actuation position 1; II.

The actuation position 2; II of the pull strap 2 is reached from the initial position 2; I by complete pulling of the pull strap 2 (pull strap actuation of the second actuation operation).

Figure 6A:
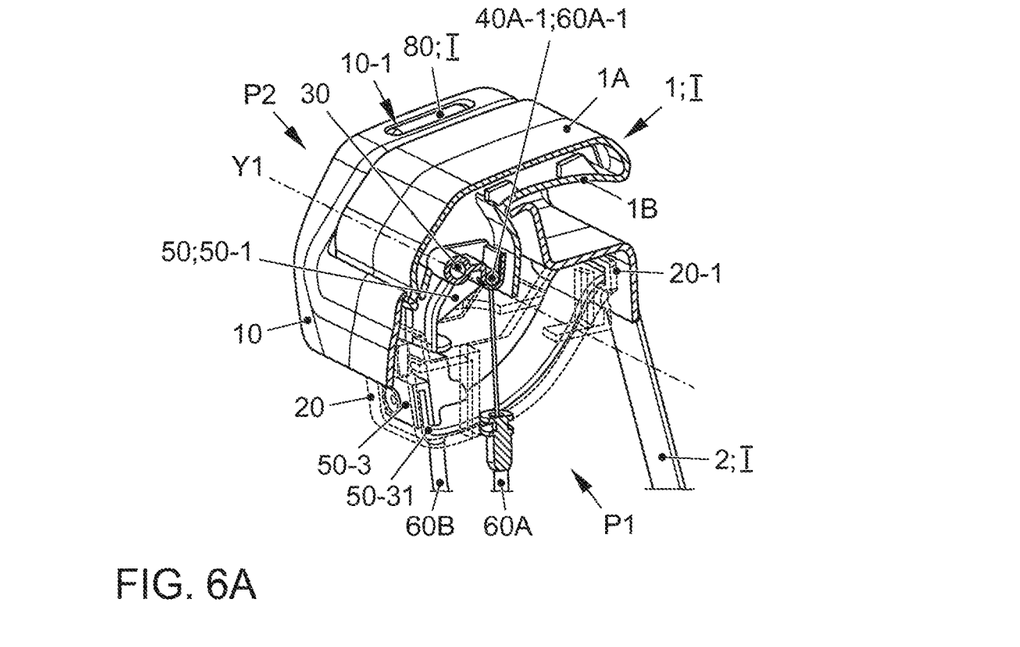
FIG. 6A illustrates the cross-section as in FIG. 5A.
Figure 6B:
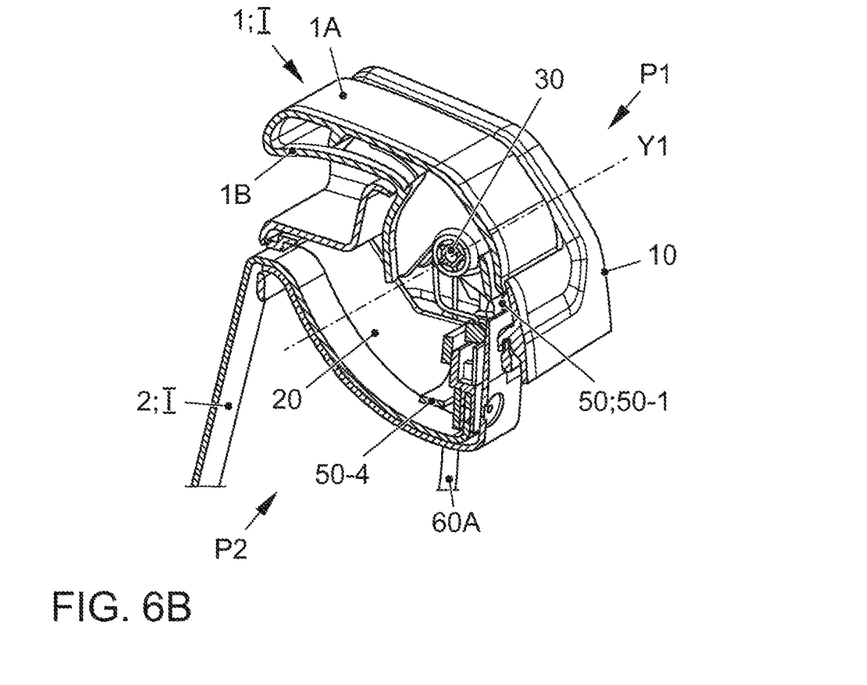
FIG. 6B illustrates a cross-section in an x-z plane through the actuating device in the initial position (view from the right)

Actuating Device B in the Initial Position I:

FIGS. 6A and 6B supplement the above description in a manner analogous to FIG. 5A, showing the unactuated actuating device B in the initial position I in cross sections, in the x-z plane in each case, wherein FIG. 6A shows the right part of the actuating device B (view P1 from the left) and FIG. 6B shows the left part of the actuating device B (view P2 from the right). With the unactuated actuating device B in its initial position I, the indicator element 80 is in its unactuated, retracted position 80; I.

Actuating device B with the handle 1 in the final actuation position II after the first actuation operation:

FIGS. 7A and 7B supplement the above description with the same reference symbols in a manner analogous to FIG. 5B, showing the actuated actuating device B—after the first actuation operation—in the final actuation position II in cross sections, in the x-z plane in each case, wherein FIG. 7A shows the right part of the actuating device B (view P1 from the left) and FIG. 7B shows the left part of the actuating device B (view P2 from the right). With the actuated actuating device B in its final actuation position II, the indicator element 80 assumes the actuated, extended position 80; II (not visible in FIG. 7B) starting from its unactuated, retracted position 80;I.

It is once again evident in FIGS. 7A and 7B that the lever 50 and the pull strap 2 have moved into the intermediate position I-II when the final actuation position II of the handle 2 is reached. The strap length of the pull strap 2 outside the opening 20-1 of the housing 20 increases by a predefinable amount as a result.

Figure 8A:
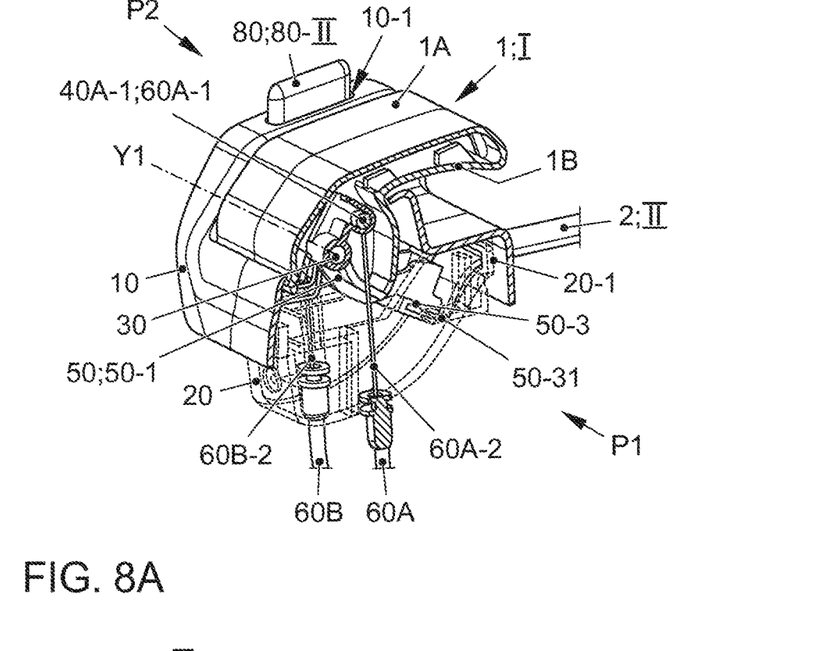
FIG. 8A illustrates the cross-section as in FIG. 5C.
Figure 8B:
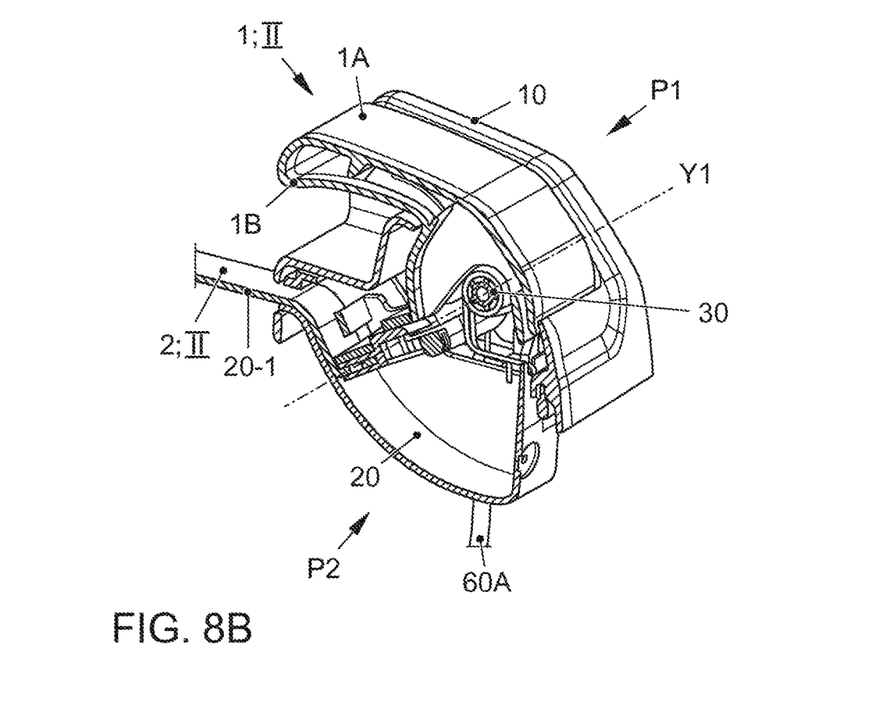
FIG. 8B is a cross-section in the x-z plane through the actuating device in the final actuation position of the second actuating element (view from the right)

Actuating device B with the pull strap 2 in the final actuation position II after the second actuation operation:

FIGS. 8A and 8B supplement the above description in a manner analogous to FIG. 5C, showing the actuated actuating device B in the final actuation position II in cross sections, in the x-z plane in each case, wherein FIG. 8A shows the right part of the actuating device B (view P1 from the left) and FIG. 8B shows the left part of the actuating device B (view P2 from the right). With the actuated actuating device B in its final actuation position II, the indicator element 80 assumes the actuated, extended position 80; II (not visible in FIG. 7B) starting from its unactuated, retracted position 80;I.

Return of the handle 1 and of the pull strap 2 from their respective final actuation positions II to the initial position I:

As already explained, the handle spring element 70A and the lever spring element 70B are tensioned in each case during actuation of the handle 1 and of the pull strap from the initial position I to the final actuation position II. Upon the release of the handle 1 or of the pull strap 2, respectively, there is a spring-force-supported return of the handle 1 and of the lever 50 starting from the final actuation position II to the initial position I by means of the first and second spring elements 70A, 70B if the handle 1 is in the final actuation position II (first actuation operation) or for spring-force-supported return of the lever 50, and thus of the pull strap 2, to the initial position I by means of the second spring element 70B if the pull strap 2 is in the final actuation position II (second actuation operation).

After the release of the handle 1 or of the pull strap 2, the return takes place automatically from the final actuation position II of the handle 1 and of the pull strap 2 back into the initial position I of the handle 1 and of the pull strap 2.

If the pull strap 2 and the lever 50 are in the intermediate position I-II when the handle 1 is actuated, a spring-force-supported return automatically takes place of the handle 1, the lever 50, and thus the pull strap 2, to the final actuation position II of the handle 1 and of the pull strap 2.

When the actuated actuating device B is again in its unactuated, retracted initial position II after the release of the handle 1 or of the pull strap 2, the indicator element 80, starting from its actuated, extended position 80 II, again assumes the unactuated, retracted position 80.

FIG. 9A shows an enlarged, perspective representation of the actuating elements 1, 2 of the actuating device B in its initial position 1; I and 2; I (view from the left), omitting the housing 20. FIG. 9B, likewise omitting the housing 20, shows a still further enlarged, perspective representation of the lever 50 for the purpose of clarifying the first actuation operation when the handle 1, represented as transparent, is actuated (view from the left).

FIGS. 9A and 9B, which are explained further as a whole, show in particular the carrier extensions 1B-2 that are located on the inside of the base part 1B-1 of the handle 1.

It is evident from FIG. 9B in particular that the lever 50 has two contact surfaces 50-5. When the handle 1 (represented as transparent) and the pull strap 2 are in the initial position 1; I and 2; I, the lever 50 is unactuated. In the case of an unactuated lever 50, the surfaces of the carrier extensions 1B-2 facing the contact surfaces 50-5 rest against the contact surfaces 50-5. If the handle 1 is actuated, the lever 50 moves counterclockwise as shown in FIGS. 9A, 9B, since the carrier extensions 1B-2 exert a force on the contact surfaces 50-5. If the pull strap 2 is actuated, the lever 50 likewise moves counterclockwise as shown in FIGS. 9A, 9B, wherein the contact surfaces 50-5 move away from the surfaces of the carrier extensions 1B-2 facing the contact surfaces 50-5.

An indicator element lever 90 is located on the first pivot axis Y1, in the background of FIGS. 9A, 9B. The indicator element lever 90 always follows a pivoting motion of the lever 50 executed about the first pivot axis Y1, as explained in detail in conjunction with the later FIGS. 10A and 10B.

As will be made clear using FIGS. 10A and 10B, the indicator element lever 90 is connected to the lever 50 in a rotationally fixed manner. According to the invention, provision is made in accordance with the exemplary embodiment that the indicator element lever 90 is rotatably supported on one side in the housing 20 and on the other side is supported in a rotationally fixed manner on the rotationally fixed axle 30 on the lever 50. In other words, when the lever rotates clockwise or counterclockwise about the first pivot axis Y1, the indicator element lever 90 moves with it accordingly.

The indicator element lever 90 includes a lever arm disc 90-3 and a bearing element 90-2, which has a (second) housing-side bearing part 90-22 on one side and a (first) lever-side bearing part 90-21 of the lever arm disc 90-3 on the other side.

A suitable bearing is worked into the housing 20 in a recess extending in the y-direction in the housing 20, so that the housing-side bearing part 90-22 rests rotatably in the bearing.

On the lever 50, a suitable bearing is likewise formed as a catch of the lever-side bearing part 90-21 on the lever 50 by means of corresponding latching parts, so that the indicator element lever 90 is supported on the lever 50 in a rotationally fixed manner, in particular is latched.

Located on the spring arm disc 90-3 is a spring element, hereinafter referred to as the indicator element spring element 70C. The indicator element spring element 70C has a first end 70C-1 and a second end 70C-2. The first end 70C-1 is supported in the indicator element 80. The second end 70C-2 is supported on the housing 20. Preferably, the first end 70C-1 is supported in the indicator element lower part 80B. In the actuated position of the indicator element 80; II, the first end 70C-1 is thus not visible.

In the assembled state, the indicator element spring element 70C is installed on the lever arm disc 90-3 under preloading. However, despite the preloading, the indicator element 80 cannot leave its unactuated position 80; I, since an open end of the lever arm 90-1 of the indicator element lever 90 holds the indicator element 80 in the unactuated position 80; I, as is explained below.

The open end of the lever arm 90-1 rests on a contour 80C of the indicator element 80. The contour 80C is designed as a lateral ridge projecting in the y-direction that forms a contoured contact surface on which the open end of the lever arm 90-1 rests. The contact surface forms a first contact region 80C-1 and a second contact region 80C-1.

Figure 10A:
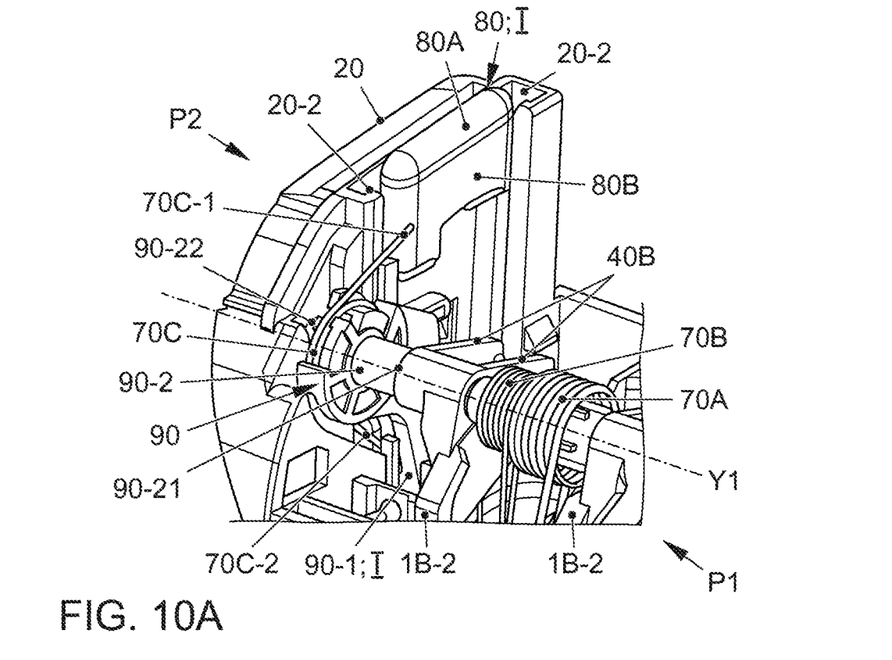
FIG. 10A is a perspective representation of the indicator element and an indicator lever with the fittings of the seat back release locked.
Figure 10B:
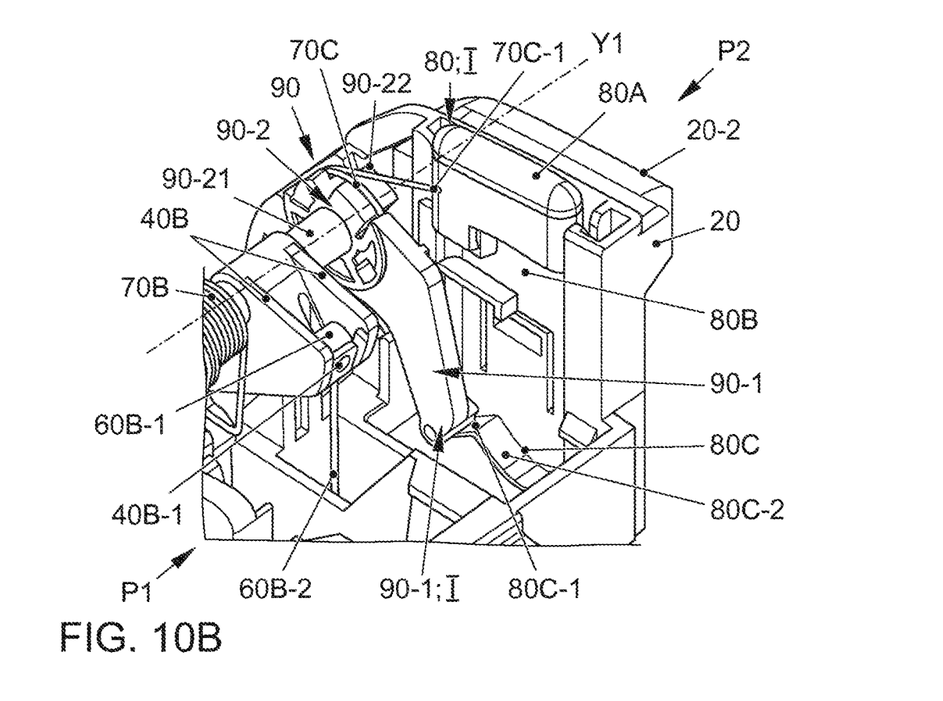
FIG. 10B is another perspective representation of the lower region of the indicator element and the indicator lever with the fittings of the seat back release locked.

In FIGS. 10A and 10B, the lever 50 and a lever arm 90-1 of the indicator element lever 90 are in an unactuated position 90-1; I, so that the indicator element 80 is also in an unactuated position 80; I. Only the indicator element upper part 80A projects out of the housing 20. The open end 90-1 rests on the first contour region 80C-1. The lever arm 90-1 extends from the lever arm disc 90-3.

When the lever 50 is actuated according to the first or second actuation operation, the lever arm 90-1 of the indicator element lever 90 is pivoted counterclockwise, so that the first end 70C-1 of the preloaded indicator element spring element 70C exerts a force on the indicator element 80 that causes a vertical translational motion of the indicator element 80 within the pocket 20-2. As a result, ultimately the indicator element upper part 80A extends (completely), and the indicator element lower part 80B extends (partially), out of the housing 20. As a result, since the indicator element lower part 80B is preferably designed in a safety color, in particular red, the user is signaled that unlocking between the backrest portion 240 and the seat portion 220 has occurred. In the actuating device B that is presented, it is signaled by means of a single indicator element 80 that the fittings c1 and c2, which are components of the combined release and adjustment mechanism, are released.

At the same time, the open end 90-1 of the indicator element lever 90 passes over the first contour region 80C-1 to the second contour region 80C-2 of the contact surface of the ridge of the indicator element 80 on the indicator element lower part 80B.

The contour 80C and its contour regions 80C-1, 80C-2 ensure precise guidance of the indicator element 80 in the vertical motion from the unactuated position 80; I to the actuated position 80; II and vice versa. In the case of a reverse actuation of the lever 50 according to the first or second actuation operation, the lever arm 90-1 of the indicator element lever 90 is pivoted clockwise as shown in FIGS. 10A, 10B, as a result of which the open end of the indicator element lever 90 moves onto the first contour region 80C-1. The indicator element 80 is translationally moved vertically downward into the pocket 20-2 in opposition to the force of the indicator element spring element 70C acting on the indicator element 80, in which process the indicator element spring element 70C is correspondingly tensioned. Finally, in the unactuated position of the indicator element 80; I, the open end again rests against the first contour region 80C-1 of the contact surface of the ridge. When the lever 50 is actuated clockwise as shown based on the FIGS. 10, 10B, in accordance with the first or second actuation operation, the fittings c1, c2 are locked and the indicator element 80 assumes its unactuated position 80; I again, so that ultimately only the indicator element upper part 80A extends above the top of the housing 20 of the actuating device B.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An actuating device for releasing at least one of a locked release mechanism or an adjustment mechanism of a vehicle seat, the actuating device comprising:
   an indicator element;
   a first actuating element; and
   a second actuating element, the first and second actuating elements and the indicator element are arranged in a housing of the actuating device,
   wherein the first and second actuating elements are connected to at least one actuating mechanism that provides for a release of the at least one of the locked release mechanism or the adjustment mechanism upon actuation of one of the first or second actuating elements,
   wherein the actuation of one of the first or second actuating elements substantially simultaneously results in an actuation of the indicator element to indicate a released state or a locked state of the at least one of the release mechanism or the adjustment mechanism, and
   wherein the indicator element is discrete from the first actuating element and the second actuating element.

2. The actuating device according to claim 1, wherein an actuation of the first actuating element or an actuation of the second actuating element, independently of one another, causes a release of the at least one of the locked release mechanism or the adjustment mechanism.

3. The actuating device according to claim 1, further comprising an actuation lever, wherein the first actuating element is in operative connection with the actuation lever, wherein the actuation lever and the first actuating element are both rotatably supported on an axle, wherein the first actuating element is adapted to be pivoted on a pivot axis formed by the axle from an initial position to a final actuation position as a result of which, upon actuation of the first actuating element from an unactuated initial position to a final actuation position, the at least one actuating mechanism provides for the release of the at least one of the locked release mechanism or the adjustment mechanism of a vehicle seat and at the same time transfers the indicator element from its unactuated position to its actuated position, and wherein the actuation lever is part of the at least one actuating mechanism.

4. The actuating device according to claim 1, further comprising an actuation lever, wherein the second actuating element is in operative connection with the actuation lever, the actuation lever being rotatably supported on an axle that forms a pivot axis, wherein the second actuating element is adapted to be moved from an initial position to a final actuation position, as a result of which, upon actuation of the second actuating element from an unactuated initial position to a final actuation position, the at least one actuating mechanism provides for the release of the at least one of the locked release mechanism or the adjustment mechanism of a vehicle seat and at the same time transfers the indicator element from its unactuated position to its actuated position, and wherein the actuation lever is part of the at least one actuating mechanism.

5. The actuating device according to claim 3, wherein the actuation lever, which is in operative connection with the first and second actuating elements, has at least one Bowden cable carrier, wherein upon actuation of one of the first or second actuating elements from the initial position to the final actuation position, the actuation lever displaces the Bowden cable carrier, wherein one end of at least one Bowden cable is connected to the Bowden cable carrier and a second end of the at least one Bowden cable is connected to the at least one of the release mechanism or the adjustment mechanism of a vehicle seat.

6. The actuating device according to claim 3, wherein the indicator element is in operative connection with an indicator element lever that is arranged to be rotatable on the axle about the pivot axis and wherein the indicator element lever is connected in a rotationally fixed manner to the actuation lever.

7. The actuating device according to claim 6, wherein the indicator element lever has a lever arm disc forming a bearing element that includes a first bearing part and a second bearing part, wherein the first bearing part is supported in a rotationally fixed manner on the actuation lever and the second bearing part is rotatably supported in the housing of the actuating device.

8. The actuating device according to claim 7, wherein the lever arm disc carries an indicator spring element, which has a first end and a second end, wherein the first end is supported in the indicator element and the second end is supported on the housing of the actuating device.

9. The actuating device according to claim 7, wherein a lever arm of the indicator element lever, extending from the lever arm disc, has an open end that rests against a contour of the indicator element, wherein the contour is implemented as a ridge that forms a contoured contact surface on which the open end of the lever arm rests, and wherein the contact surface forms a first contour region and a second contour region.

10. The actuating device according to claim 7, wherein the lever arm of the indicator element lever is pivoted upon actuation of one of the actuating elements from the initial position to the final actuation position and an accompanying actuation of the indicator element lever, as a result of which the first end of an indicator spring element exerts a force on the indicator element, via which a vertical translational motion of the indicator element within a pocket is effected, via which the indicator element moves from an unactuated, retracted position into the actuated, extended position.

11. The actuating device according to claim 10, wherein the indicator element has an indicator element upper part and an indicator element lower part, wherein the indicator element upper part and the indicator element lower part are located below a top of the housing of the actuating device in the unactuated, retracted position, wherein the indicator element upper part stands up in an opening of the housing so as to be visible from outside, and wherein, in the actuated, extended position the indicator element upper part extends, and the indicator element lower part extends at least partially, through the opening so that the indicator element upper part and the indicator element lower part project out of the housing and are visible from outside.

12. A vehicle seat comprising:
a backrest,
a seat base, and
the actuating device according to claim 1.

13. The actuating device according to claim 1, wherein the first actuating element is operatively connected to a first spring element and the second actuating element is operatively connected to a second spring element,
wherein the first actuating element is rotatably supported on an axle, the axle defining a pivot axis,
wherein the first spring element and the second spring element are wound around the axle,
wherein the indicator element is connected to a lever arm disc via an indicator spring element, the lever arm disc being pivotally mounted so as to be pivotable about the pivot axis, and
wherein the indicator spring element is wound about the lever arm disc, with one end of the indicator spring element being connected to the indicator element.

14. The actuating device according to claim 1, wherein the indicator element is linearly movable through a first opening of the housing, such that when actuated, the indicator element extends through the first opening of the housing and when actuation is released, the indicator element is retracted back through the first opening into the housing, and wherein the first actuating element extends through a second opening of the housing and the second actuating element extends through a third opening of the housing.

15. The actuating device according to claim 1, wherein the housing is mounted to a backrest portion of the vehicle seat.

16. The actuating device according to claim 3, wherein upon actuation of the first actuating element, a carrier extension surface of the first actuating element comes into contact with a contact surface of the actuation lever and pushes the actuation lever such that the actuation lever is rotated.

17. The actuating device according to claim 1, wherein the first actuating element comprises a handle coupled with an actuation lever, the first actuating element and the actuation lever being pivotally supported about a pivot axis, wherein the indicator element is connected to a lever arm disc via an indicator spring element, the lever arm disc being pivotally supported about the pivot axis, wherein a lever arm projects from the lever arm disc, wherein the housing has a contour including a raised portion having a first contact surface engaged by the lever arm in the locked state and a second contact surface at an obtuse angle relative to the first contact surface that is engaged by the lever arm in the released state.

* * * * *